United States Patent [19]

Duerig et al.

[11] Patent Number: 4,831,614
[45] Date of Patent: May 16, 1989

[54] DIRECT ACCESS STORAGE UNIT USING TUNNELING CURRENT TECHNIQUES

[75] Inventors: Urs T. Duerig, Ruschlikon; James K. Gimzewski, Zurich; Wolfgang D. Pohl, Adliswil, all of Switzerland

[73] Assignee: International Business Machines Corporation, Armonk, N.Y.

[21] Appl. No.: 25,432

[22] Filed: Mar. 13, 1987

[30] Foreign Application Priority Data

May 27, 1986 [EP] European Pat. Off. ........ 86107188.4

[51] Int. Cl.$^4$ ................................................ G11B 7/00
[52] U.S. Cl. ..................................... 369/101; 369/111; 365/157; 365/217; 365/174; 365/118
[58] Field of Search ................... 369/97, 101, 36, 264, 369/111, 44; 365/128, 157, 118, 217; 235/440, 468, 475; 346/158; 353/19

[56] References Cited

U.S. PATENT DOCUMENTS

| | | | |
|---|---|---|---|
| 3,885,094 | 5/1975 | Russell | 369/44 X |
| 4,014,604 | 3/1977 | Schwartz | 353/19 X |
| 4,343,993 | 8/1982 | Binnig et al. | 250/306 |
| 4,575,822 | 3/1986 | Quate | 364/174 |
| 4,592,042 | 5/1986 | Lemelson et al. | 369/264 X |
| 4,670,866 | 6/1987 | Hasegawa et al. | 369/36 |

FOREIGN PATENT DOCUMENTS

| | | | |
|---|---|---|---|
| 116936 | 8/1984 | European Pat. Off. | 369/97 |
| 61-16045 | 1/1986 | Japan | 369/111 |

OTHER PUBLICATIONS

"Single Tube Three Dimensional Scanner for Scanning Tunneling Microscopy", Binnig et al, Rev. Sci. Inst. 57(8), Aug. 1986, pp. 1688–1689.
G. Binnig et al, "Tunneling Through a Controllable Vacuum Gap", Appl. Phys. Lett. 40(2), Jan. 15, 1982, pp. 178–180.
D. J. DiMaria, "The Properties of Electron and Hole Traps in Thermal Silicon Dioxide Layers Grown on Silicon", from Chapter IV of The Physics of SiO2 and Its Interface, by Pantelides, editor, pp. 160–177, Pergamon 1978.
K. E. Petersen, "Dynamic Micromechanics on Silicon: Techniques and Devices", IEEE Trans. El. Dev., vol. ED-25, No. 10, Oct. 1978, pp. 1241–1249.
C. Gerber et al, "Magnetostrictive Positioner", IBM Technical Disclosure Bulletin, vol. 27, No. 11, Apr. 1985, p. 6373.
G. Binnig et al, "Fast Scan Piezo Drive", IBM Technical Disclosure Bulletin, vol. 27, No. 10B, Mar. 1985, pp. 5976–5977.

*Primary Examiner*—Aristotelis M. Psitos
*Attorney, Agent, or Firm*—Henry E. Otto, Jr.

[57] ABSTRACT

The storage unit comprises an array of tunnel tips (13) arranged at tunneling distance from a recording surface (2a) of a storage medium (2) which is capable of permitting digital information to be written or read through variations of the tunneling current. The storage medium (2) is attached to the free end of a piezoceramic bendable tube (3). In operation, the free end of the tube (3) is moved in a circular orbit by repetitive sequential energization of oppositely arranged pairs of 90° phase shifted electrodes (4,6 and 5,7). This tube movement causes each tunnel tip (13) to scan a respective unique associated annular area of the storage medium (2). To address a particular concentric track in a particular annular area, tunneling current is applied to the associated tip (13) via respective electrodes (16,18) while, concurrently, a potential is applied via electrodes (4,6 and 5,7) to tube (3) of a magnitude corresponding to the desired orbital diameter for the tube.

10 Claims, 2 Drawing Sheets

DIRECT ACCESS STORAGE UNIT USING TUNNELING CURRENT TECHNIQUES

This invention relates to direct access storage and in particular to a compact direct access storage unit embodying a novel storage medium and transducer configuration that renders it capable of storing in the order of tens of gigabits of digital information.

BACKGROUND OF THE INVENTION

Present-day direct access storage units usually employ a magnetizable recording medium that is rotated relative to an essentially stationary magnetic transducer. The transducer, or magnetic head, typically comprises a magnetizable core providing a path for the magnetic flux generated by currents flowing in a coil wound on said core and creating a magnetic field across the gap of the core. The gap faces the surface of the recording medium at a preferably very small but constant distance. As the magnetic field varies, these variations are "written" into the recording medium. Conversely, for "reading", as magnetic transitions stored on the recording medium travel past the pole tips at the gap of the magnetic core, flux is induced in the windings of the coil and can be read out by suitable electronic circuitry.

One commercially available direct access storage unit has an areal density of about 1.2 million bits per square centimeter which is the equivalent of a storage area of 80 $\mu m^2$ per bit. This density is achieved with a gap of about 1 $\mu m$ width and a flying height of the transducer over the recording surface of less than 250 nm created by a pressurized air bearing generated automatically as the recording medium rotates.

A great step forward toward reducing the distance between the transducer and recording medium is disclosed in U.S. Ser. No. 909,799, filed Sept. 22, 1986, wherein the flying height is controlled by a feedback loop arrangement which uses the tunneling current flowing across the gap between transducer and recording medium. This permits the gap to be as small as several tens of nanometers and, accordingly, an increase in storage density at least by a factor of 10 with respect to those storage units relying on an air bearing for the transducer flying height regulation.

In addition to signal amplitude, domain size and other factors, the recording density is dependent on the size of the transducer, namely the size of the gap of the magnetic head. The small gap width of 1 $\mu m$ is achieved with a thin film head. Photolithographic techniques enable controlling the dimensions of the head to within a few percent and permit placement of the winding with micrometer accuracy. However, it is difficult to reduce the gap width below 1 $\mu m$ with conventional techniques. Alternative solutions are therefore necessary to permit a further reduction in the bit size and increase in storage capacity per unit area.

SUMMARY OF THE INVENTION

Toward this end and according to the invention, a direct access storage unit is provided having a different storage concept, storage medium and transducer configuration than used in the conventional direct access storage devices above described.

The present invention takes advantage of phenomena associated with metal-vacuum-metal (MVM) tunneling which has been explored extensively in context with the Scanning Tunneling Microscope (cf. Binnig et al., Appl. Phys. Lett. 40 (1982), p. 178); but it is not limited to tunneling phenomena and could also be used with other techniques allowing for sufficient control of transducer position and flying height.

In conventional storage disks, the storage locations are arranged in concentric circles or tracks about a single common center. By contrast, on the storage medium of the present invention, the storage locations are arranged in a plurality of identical groups, with all storage positions in any one group being arranged in concentric circles or tracks about the group's own center and all centers being arranged in an ordered array on the recording surface of the storage medium. The concentric circles or tracks of storage locations of each group form a "microdisk" with a diameter of less than 0.1 mm. Even with several hundred "microdisks" per recording surface, the area required for a given storage capacity is much smaller than required in conventional storage devices.

As illustrated, the storage medium is attached to the free end of an elongated piezoceramic bendable tube, the other end of which is rigidly anchored. Closely adjacent a recording surface at the free end of the tube is a transducer comprising an array of tunnel tips each associated with a respective one of the microdisks. Each tunnel tip faces, and is spaced closely adjacent to, the recording surface on the storage medium and each tip is attached to a respective cantilever beam. The distance (in the nanometer range) between each tunnel tip and the recording surface initially is independently adjusted so that each tip normally is disposed at the same preselected tunneling distance from the recording surface.

Means including oppositely arranged arcuate electrode pairs are provided in surrounding relation to the free end of the piezoceramic tube. By successively energizing the electrode pairs, the free end of the tube and hence the recording surface can be forced to move in a circular orbit. The diameter of this orbit will vary according to the potential differential that is selected. Thus, the recording surface at the free end of the piezoceramic tube can be caused to move in any one of a plurality of concentric orbits relative to the tunnel tips of the transducer array. As a result, each tip will scan that one of the plurality of concentric circles or tracks of its microdisk corresponding to the selected orbit diameter of the tube. Means are also provided for selectively energizing the electrodes associated with a selectable one of the tips for moving the selected tip toward the recording surface. Digital information is written into and/or read out of the storage medium by varying the tunneling current flowing across the gap between the tunnel tip and recording surface.

Thus, in summary, recording involves addressing and moving a selectable one of the tips in the array and concurrently energizing the electrode pairs surrounding the tube to a potential corresponding to an orbit diameter that permits access to a desired one of the concentric tracks on the associated microdisk.

The storage medium comprises a material which is sensitive to the tunnel current. The storage medium capable of recording variations of the tunneling current preferably comprises a thin layer of silicon dioxide on top of a silicon substrate. The oxide is prepared to have a plurality of trapping sites of about 2.4 eV depth. Electrons emitted from a tunnel tip can be stably trapped at such states at room temperature. (Cf. D. J. Dimaria in Pantelides (Ed.) "The Physics of $SiO_2$ and its Interfaces", Pergamon 1978, p. 160 et seq.) This mechanism qualifies for write/read applications.

DESCRIPTION OF PREFERRED EMBODIMENT

Figure 1:
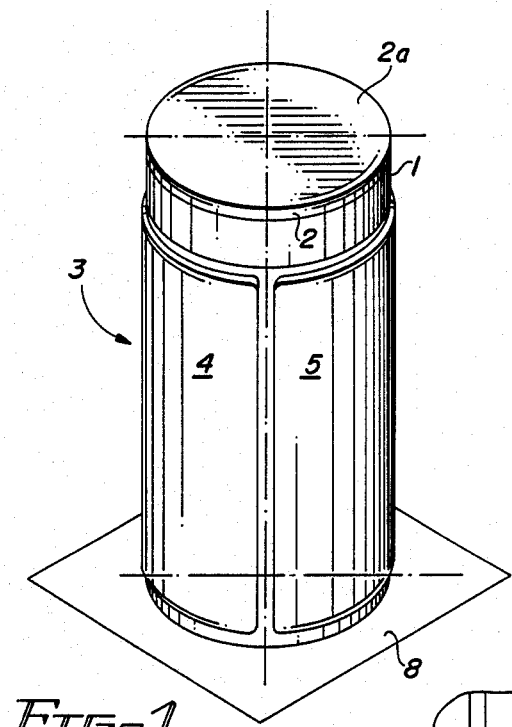
FIG. 1 is a perspective view of a storage medium supported on a piezoceramic bendable tube anchored at one end.

As illustrated in FIG. 1, a direct access storage unit embodying the invention comprises a substrate 1 which may consist of a silicon chip of about 3 mm diameter covered with a thin layer 2 of silicon dioxide. Oxide layer 2 may have a thickness of about two or three nanometers. Its recording surface 2a is finished to be almost atomically flat over areas of $100 \times 100$ $\mu m^2$. Such a degree of perfection can be achieved with polishing techniques. If preferred, epitaxially grown semiconductor surfaces or cleaved crystals may be used.

Figure 2:
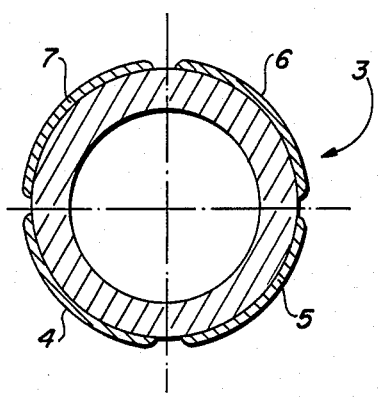
FIG. 2 is a cross-sectional view of the piezoceramic tube of FIG. 1 and surrounding electrodes.

Substrate 1 is attached to a piezoceramic tube 3 carrying electrodes 4 through 7 (FIG. 2) on its outer surface in such a way that the tube, with one end fixed in a frame 8, can be caused to bend sideways from its longitudinal axis by applying opposite potentials to electrodes located on diametrically opposite regions of the tube's cylindrical surface.

Figure 3:
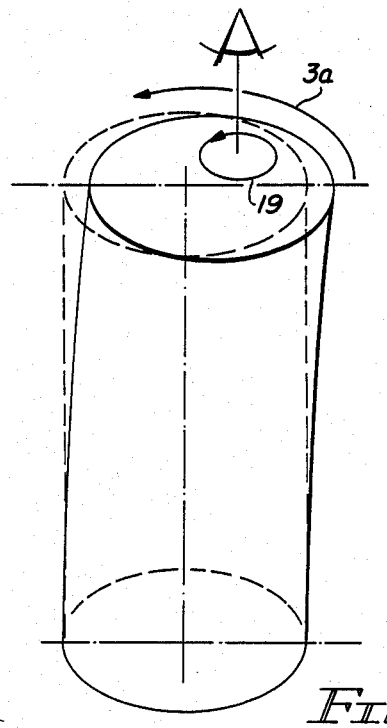
FIG. 3 is a schematic illustration of the circular path in which the free end of the piezoceramic bendable tube orbits during operation.

The free end of tube 3, i.e., the end carrying substrate 1, can be forced to move in a circular orbit by applying sinusoidal voltages to electrodes 4 through 7, with the voltages applied successively to electrodes 4 and 6 having their phase shifted by 90° with respect to the phase of the voltages later successively applied to electrodes 5 and 7. Thus, as viewed by a stationary observer, each point on the surface of the oxide layer 2 travels in a circular orbit 3a (FIG. 3). A large orbital radius is obtained by exciting tube 3 at its bending resonant frequency.

The product of radius and resonant frequency represents a figure of merit for a piezoelectric tube. It depends on materials constants, viz., piezoelectric coefficient, elasticity modulus, density, a quality factor, a shape factor, and on the applied electric field. A commercially available piezoceramic tube of about 6 mm outer diameter and about 0.4 mm wall thickness, when excited with 20 V a.c. will circulate at a frequency of 5 kHz, with an orbital radius of 50 $\mu m$ and a quality factor of 50.

Accordingly, for a tube 3 with an orbital radius of 50 $\mu m$, each point on each circular path on the oxide layer 2 will pass the stationary observer 5,000 times per second corresponding to 300,000 revolutions per minute (as compared to around 3,600 revolutions per minute for conventional disks).

Figure 4:
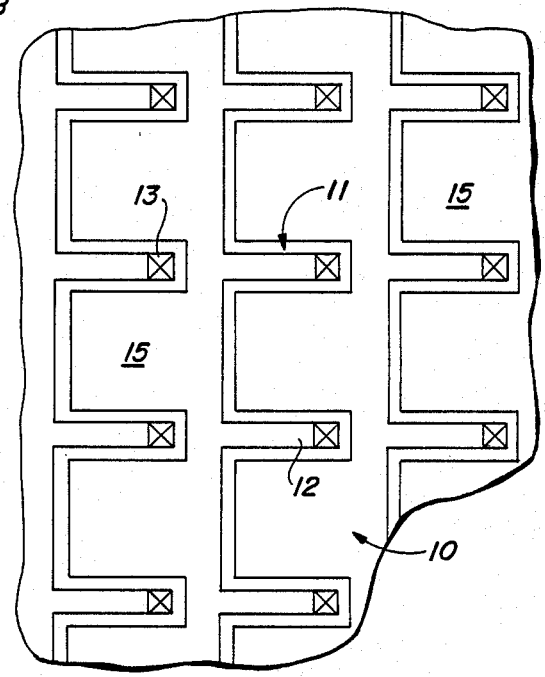
FIG. 4 is a fragmentary top plan view of part of a transducer comprising an array of tunnel tips.
Figure 5:
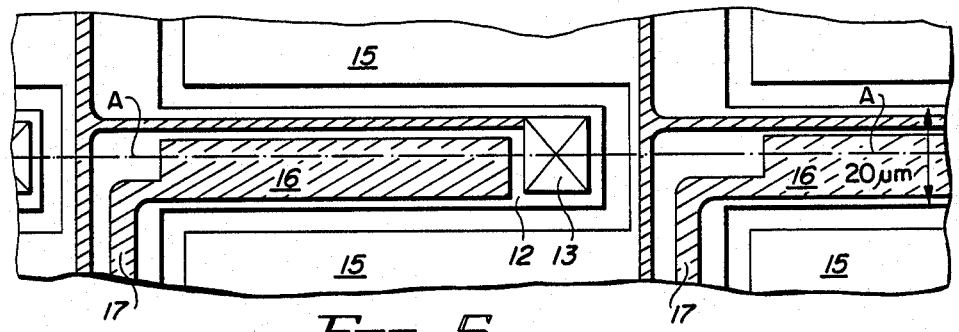
FIG. 5 is a more detailed fragmentary top plan view, to enlarged scale, of a part of the array of FIG. 4.
Figure 6:
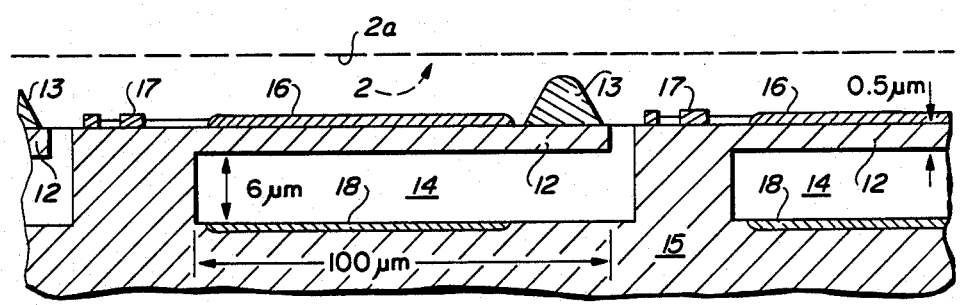
FIG. 6 is a sectional view taken along line A—A of FIG. 5

Information is stored in the form of trapped charges on silicon dioxide layer 2 by bombardment of the particular storage locations with electrons generated at the transducer. A transducer array 10 (FIGS. 4–6) comprises a plurality of uniformly spaced transducers 11. Each transducer 11 comprises a cantilever beam 12 bearing at its free end a tunnel tip 13. All cantilever beams 13 in the array extend across a cavity 14 machined into a substrate 15, preferably of silicon or gallium arsenide, on which array 10 is built. The manufacture of the cavities 14 and cantilever beams 12 on substrate 15 follows known micromechanical techniques as described, e.g. by K. E. Petersen, "Dynamic Micromechanics on Silicon: Techniques and Devices", IEEE Trans. El. Dev., Vol. ED25, No. 10, 1978, pp. 1241–1249, and in U.S. Ser. No. 836,274, filed Mar. 5, 1986.

Each cantilever beam 12 is selectively operable by electrostatic deflection to cause its associated tip 13 to assume a position within tunneling distance from its associated storage area on the recording silicon dioxide layer 2. To this end, each cantilever beam 12 carries an electrode 16 which is connected to a conductor 17 arranged on substrate 15. A counterelectrode 18 is placed on the bottom of each cavity 14. Application of a potential across a specific electrode pair 16, 18 causes the associated cantilever beam 12 to deflect, thus varying the distance between its respective tunnel tip 13 and the surface of recording layer 2 (see FIGS. 6 and 7). Note that separate means (not shown) is associated with each cantilever beam 12 for independently and selectively controlling the potential across its respective set of electrodes 16,18.

The preferred specifications for cantilever beams 12 are:

Material: $SiO_2$
Length: 100 $\mu m$
Width: 10 ... 20 $\mu m$
Thickness: 0.5 $\mu m$
Operating voltage: <20 V With these parameters, each cantilever beam 12 will have a bending resonant frequency of about 50 kHz and achieve a maximum deflection of 200 nm. Because of the monolithic nature of the transducer array 10 on its substrate 15, all tunnel tips 13 are normally disposed in a fixed distance relation as determined during the manufacturing process.

As briefly mentioned above, the invention employs the tunnel effect for information storage. Obviously, storage density is improved if the individual storage locations can be made smaller and if the physical means for writing/reading the information can be better focused or concentrated. These requirements call for tight control of very small distances between transducer and recording surface. The tunneling technique in an ideal way enables meeting all these requirements.

Electron tunneling (and field emission) through vacuum or air (which at the distances in question is equivalent to a vacuum) is excellently suited to control distances in the 0.1 ... 10 nm range (cf. G. Binnig, H. Rohrer, C. Gerber and E. Weibel, Appl. Phys. Lett. 40

(1982) 178). The control mechanism is based on the tunnel current which varies exponentially with the size of the gap between two conductors.

With a tunnel tip 13 of reasonable sharpness having a radius of curvature of about 3 nm at the apex, the tunnel current is laterally confined to an area of approximately 1 nm$^2$. Accordingly, the current density reaches very high values, such as e.g. $10^3$ A/mm$^2$ for a tunnel current of 1 nA. In view of the sharp focussing of the electron beam passing from tip 13 to the surface 2a of the recording layer 2, the bit size can be made to equal about 10 nm$^2$. With a maximum circular deflection of 50 $\mu$m of piezoceramic tube 3, the outer diameter of the annular storage area associated on layer 2 with each one of 400 tunnel tips 13 in the array 10 is, of course, 100 $\mu$m. With an inner diameter of 30 $\mu$m, the number of tracks per annulus 19 (only one of which is shown in FIG. 3) is 3000, the storage capacity per annulus hence being 100 Mbit, and the total amounting to 40 Gbit for a 400-tip storage unit.

Figure 7:
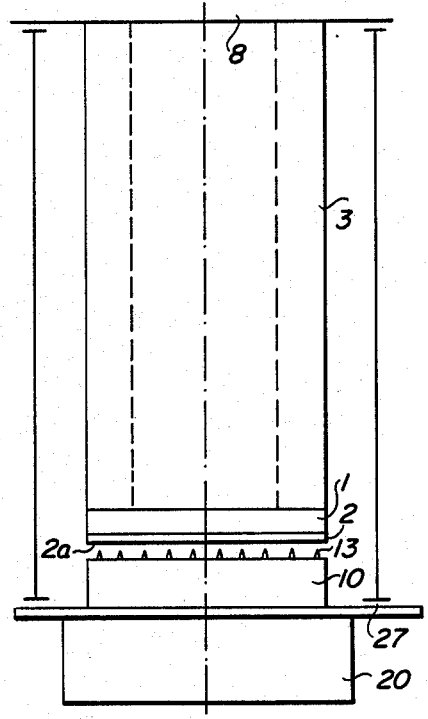
FIG. 7 is a schematic illustration of the arrangement of the storage medium with respect to the transducer array, shown in its actual operating position but upside down relative to the showing in FIGS. 1 and 3.

A preferred embodiment of a storage medium/tunnel tip array assembly is schematically shown in FIG. 7. Its overall size is about 30×30×60 mm$^3$. Tunnel tip array 10 is mounted parallel to and facing recording surface 2a. Layer 2 is supported by substrate 1 at the free end of piezoceramic tube 3. The other end of tube 3 is rigidly fixed to frame 8. To be able to bring tunnel tip array 10 to within tunneling distance (i.e. ~1 nm) from storage layer 2, array 10 is attached to a coarse approach unit 20.

OPERATION

Figure 8:
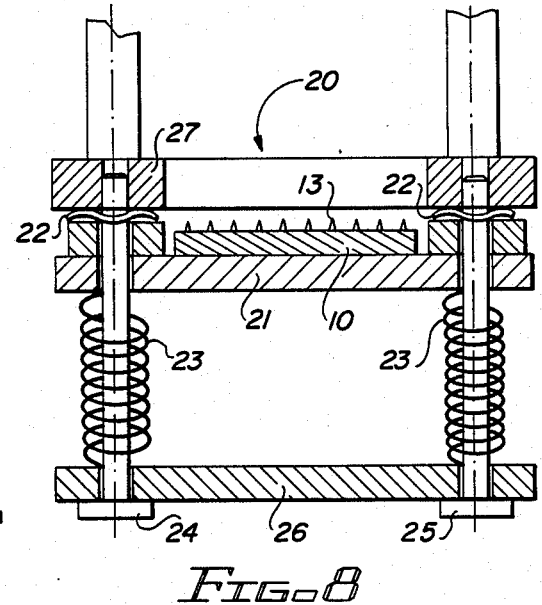
FIG. 8 is a vertical sectional view, to enlarged scale, of a portion of the structure shown in FIG. 7 which illustrates a preferred arrangement for supporting the piezoceramic bendable tube and retaining the transducer array in such manner as to permit concurrent coarse adjustment of all tips of the array relative to the storage medium.

As illustrated in FIG. 8, coarse approach unit 20 comprises a tip array holder 21 mounted between sets of hard springs 22 and soft springs 23. Screws 24 and 25 in combination with springs 22 and 23 and bottom plate 26 permit sufficient motion for coarse manual adjustment of tip array 10 with respect to layer 2. An annular plate 27 receives screws 24 and 25 and provides a mounting base for frame 8.

After the coarse approach manual adjustment of the entire array concurrently, each cantilever beam 12 is individually adjusted to position its associated tunnel tip 13 at the same preselected tunneling distance from the recording surface 2a. This adjustment is accomplished by adjusting the bias potential across the electrodes 16 and 18 associated with each respective tip 13 to bend the cantilever beam 12 involved electrostatically as necessary to normally position the tunnel tip the preselected distance from the recording surface 2a. The control circuitry necessary for this adjustment may be integrated on tunnel tip array 10. The distance is not adjusted for each storage track but may preferably be averaged over a tenth of a storage annulus 19, corresponding to about 60 $\mu$m or 6000 bit by including this in the fine tune bias potential circuitry as a dynamic feature whereby adjustment is made after orbit selection and prior to the read or write signal initiated change in tunneling tip position. On such small lateral distances, variations in surface height of the storage layer 2 are negligible.

Following this fine adjustment of the position of the tunnel tips 13 relative to the surface of the storage medium, information can be written on a selectable concentric track within the area of storage annulus 19 according to the magnitude of the tunneling current. In the embodiment as thus far described, charges are trapped on surface 2a of the silicon dioxide layer 2 by applying a voltage pulse of appropriate amplitude, it being assumed that the storage unit is of the erasabke type. However, if preferred, as for example for a read-only storage unit, the tunneling current could electrode the recording surface 2a on which a bit of stored information is represented by a chemical modification of the storage medium 2 through carbonization of hydrocarbons at said surface, in the manner more fully described by Binnig et al in Physica 127b (1984) at page 37.

It will thus be seen that successive alternate energization of opposite electrode pairs 4,6 and 5,7, respectively, will deflect the free end of tube 3 radially outward and concurrently drive it in circular orbit 3a (FIG. 3). This will move the respective storage annuli 19 (only one of which is shown, in disproportionately large scale for clarity) in respective circular paths relative to the normal axis of element 3. The particular concentric track addressed in a respective microdisk or annulus 19 will depend upon the diameter of orbit 3a as determined by the magnitude of the potential applied to the electrode pairs 4,6 and 5,7 and by the particular tip 13 that is concurrently energized by its corresponding electrodes 16,18.

Bytes, words, lines, etc. can be written in parallel on the plurality of storage annuli 19 because of the fixed-distance relationship of both the tunnel tip array 10 and the corresponding array of annuli 19. As in conventional direct access storage apparatus, certain storage annuli may be reserved for addressing purposes to facilitate guiding the array of tunnel tips safely to a certain address in spite of the extreme smallness of the storage unit embodying the invention.

Electronic circuitry required for processing the write/read signals can be integrated on the chip carrying the tunnel tip array to avoid undesired increases in the cycle time.

It will now be seen that the direct access storage unit embodying the invention has a higher bit rate and correspondingly shorter access time than conventional direct access storage devices, and that said unit does not require rotating parts, like electromotors, to effect relative movement between the storage medium and transducer.

It will be understood by those skilled in the art that the effects of temperature drift can be minimized by appropriate stabilization, e.g., in a cryogenic environment. Also, if desired, the entire storage unit may be contained within a vacuum or in an atmosphere of inert gas. Also, if desired, the piezoelectric tube 3 may be replaced by other piezoelectric or magnetostrictive elements such as described in IBM Technical Disclosure Bulletin Vol. 27, No. 10B, pp. 5976/7 and Vol. 27, No. 11, pp. 6373, respectively.

While the invention has been particularly shown and described with reference to a preferred embodiment thereof, it will be understood by those skilled in the art that the foregoing and other changes in the form and details may be made therein without departing from the spirit and scope of the invention, and the scope of the invention is not to be deemed limited except as defined in the claims.

What is claimed is:

1. A direct access storage unit comprising:
   a storage medium having a flat recording surface;
   means for moving said surface in a circular orbit;
   at least two detector elements disposed adjacent said surface, and operable during orbital movement of said surface to scan a respective circular track on said surface; and means for moving each said detector element periodically and selectively relative to said surface to selectively record and read information on a selectable track on said medium;

said means for moving said surface comprising a piezoelectric element that is secured at one end and is free at its opposite end, and carries a plurality of electrodes arranged in opposed pairs about the peripheral surface of said element adjacent its said opposite end, those of each pair being out of phase with those of each other pair, for causing the free end to bend during successive repetitive energization of different electrode pairs and move the free end of said element and hence said recording surface in said circular orbit.

2. A storage unit according to claim 1, wherein the diameter of said orbit is selected and determined according to the selected potential differential across said electrode pairs, and wherein each detector element will scan that one of a plurality of concentric tracks within a respective circular area corresponding to said potential differential.

3. A storage unit according to claim 1, wherein said means for moving each detector element comprises a cantilever beam having the element mounted at its free end facing said surface, and means including electrodes for selectively varying the distance between each element and surface according to the potential applied to the last-mentioned electrodes.

4. A storage unit according to claim 1, wherein said storage medium has its said recording surface provided by a silicon dioxide layer that is formed on a silicon substrate and has a plurality of charge trapping sites.

5. A direct access storage unit comprising:
a storage medium having a flat recording surface providing a plurality of circular storage areas in each of which digital information is recordable in a selectable one of a plurality of concentric tracks;
means for moving said surface in a circular orbit of selectable diameter;
a transducer array disposed adjacent said surface, comprising a plurality of cantilever supported tips, each for accessing a different one of said storage areas; and
means operable by electrostatic deflection for moving said tips periodically and selectively relative to said surface to selectively record and read said digital information on said medium in a selectable one of the tracks of the selected storage area associated with the selected tip, the selected track corresponding to the diameter of said orbit.

6. A storage unit according to claim 5, wherein the tips constituting said array are supported on a common substrate, and including means for coarse adjusting the distance of the substrate and hence of all tips concurrently relative to said recording surface, and means for thereafter fine adjusting the distance of each tip individually to a desired preselected distance, in the nanometer range, from the recording surface.

7. A storage unit according to claim 5, wherein said means for moving said surface comprises a piezoceramic element that is secured at one end and is free at its opposite end, and carries a plurality of electrodes arranged in opposed pairs about the peripheral surface of said element adjacent its said opposite end, those of each pair being out of phase with those of each other pair, for causing the free end to bend during successive repetitive energization of different electrode pairs and move the free end of said element an hence said recording surface in said circular orbit.

8. A storage unit according to claim 7, wherein the diameter of said orbit is selected and determined according to the selected potential differential across said electrode pairs, thereby to cause the selected tip to address a corresponding one of the concentric tracks of its respective storage area.

9. A direct access storage unit comprising:
a storage medium having a flat recording surface;
support means having one end fixed and a free end supporting said medium and bendable radially outward from a normal axis,
means for bending said support means and moving said surface in a circular orbit offset radially from said axis;
at least two detector elements, each separated from said surface by a respective gap in the nanometer range to permit a tunneling current to flow across the corresponding gap and operable during orbital movement of said surface to scan a different circular area of said surface; and
means operable by electrostatic deflection for moving each said detector element periodically and selectively relative to said surface for transducing information between said elements and medium by modulating the terminal current flow across said gap.

10. A storage unit according to claim 9, including means for initially adjusting said gap to a preselected magnitude in the nanometer range by an appropriate bias potential, and means subsequently responsive to variations in potential relative to said bias potential for varying the tunneling current for writing and reading said information on said medium.

* * * * *